(12) United States Patent
Abe et al.

(10) Patent No.: US 9,364,996 B2
(45) Date of Patent: Jun. 14, 2016

(54) METHOD FOR PRODUCING GLASS CHOPPED STRAND MAT, AND METHOD FOR PRODUCING AUTOMOTIVE MOLDED CEILING MATERIAL

(71) Applicant: NIPPON ELECTRIC GLASS CO., LTD., Shiga (JP)

(72) Inventors: Jiro Abe, Shiga (JP); Satoshi Nishie, Shiga (JP); Kiyomasa Sugimoto, Shiga (JP)

(73) Assignee: Nippon Electric Glass Co., Ltd., Shiga (JP)

( * ) Notice: Subject to any disclaimer, the term of this patent is extended or adjusted under 35 U.S.C. 154(b) by 43 days.

(21) Appl. No.: 14/237,576

(22) PCT Filed: Dec. 5, 2012

(86) PCT No.: PCT/JP2012/081474
§ 371 (c)(1),
(2) Date: Feb. 7, 2014

(87) PCT Pub. No.: WO2013/094401
PCT Pub. Date: Jun. 27, 2013

(65) Prior Publication Data
US 2014/0299252 A1    Oct. 9, 2014

(30) Foreign Application Priority Data
Dec. 20, 2011 (JP) .................. 2011-278987

(51) Int. Cl.
*D04H 1/4218*    (2012.01)
*D04H 1/4226*    (2012.01)
(Continued)

(52) U.S. Cl.
CPC .......... *B29C 70/12* (2013.01); *B32B 5/245* (2013.01); *B32B 7/12* (2013.01); *B32B 37/24* (2013.01);
(Continued)

(58) Field of Classification Search
CPC ..... D04H 1/4218; D04H 1/4226; D04H 1/60; D04H 1/70; D04H 1/72; D04H 1/736; D04H 1/74; B60R 13/0212; B32B 2262/101; B32B 2605/003
See application file for complete search history.

(56) References Cited

U.S. PATENT DOCUMENTS

| 5,041,178 A * | 8/1991 | Kielmeyer ............... B32B 5/26 156/229 |
| 5,565,049 A * | 10/1996 | Simmons .............. B29C 70/508 156/212 |
| 2003/0113526 A1 | 6/2003 | Jaffee |

FOREIGN PATENT DOCUMENTS

| JP | 2002-88627 | 3/2002 |
| JP | 2005-307407 | 11/2005 |
| JP | 2005-350815 | 12/2005 |

OTHER PUBLICATIONS

Extended European Search Report for European Patent Application No. 12860991.4 issued Aug. 20, 2015.
(Continued)

*Primary Examiner* — Michael Tolin
(74) *Attorney, Agent, or Firm* — Renner, Otto, Boisselle & Sklar, LLP

(57) ABSTRACT

A technique of producing a high-quality and high-functionality glass chopped strand mat applicable to recent automotive molded ceiling materials which have excellent design and reduced weights. A method for producing a glass chopped strand mat (M) by forming glass chopped strands (S) into a sheet, includes a first conveying step of continuously conveying the glass chopped strands (S) in a distributed form while spraying resin powder (A) serving as a binder onto the glass chopped strands (S), and a second conveying step of continuously conveying the glass chopped strands (S) with the adhering resin powder (A) while performing a heating treatment on the glass chopped strands (S) at a temperature higher than the melting point of the resin powder (A). A conveying speed in the second conveying step is higher than a conveying speed in the first conveying step, and the difference therebetween is 3 to 8 m/min.

4 Claims, 2 Drawing Sheets

(51) Int. Cl.

| | | |
|---|---|---|
| *D04H 1/60* | (2006.01) | |
| *D04H 1/70* | (2012.01) | |
| *D04H 1/736* | (2012.01) | |
| *D04H 1/74* | (2006.01) | |
| *B29C 70/12* | (2006.01) | |
| *B32B 37/24* | (2006.01) | |
| *B32B 5/24* | (2006.01) | |
| *B32B 7/12* | (2006.01) | |
| *B60R 13/02* | (2006.01) | |

(52) U.S. Cl.
CPC ........... *D04H 1/4218* (2013.01); *D04H 1/4226* (2013.01); *D04H 1/60* (2013.01); *D04H 1/70* (2013.01); *D04H 1/736* (2013.01); *D04H 1/74* (2013.01); *B32B 2262/101* (2013.01); *B32B 2266/0278* (2013.01); *B32B 2305/022* (2013.01); *B32B 2305/20* (2013.01); *B32B 2307/54* (2013.01); *B32B 2307/718* (2013.01); *B32B 2309/14* (2013.01); *B32B 2315/085* (2013.01); *B32B 2605/00* (2013.01); *B32B 2605/003* (2013.01); *B60R 13/0212* (2013.01)

(56) References Cited

OTHER PUBLICATIONS

First Office Action for Chinese Patent Application No. 201280045250.6 along with machine translation of a main part thereof issued Aug. 25, 2015.
PCT/JP2012/081474; PCT International Search Report and Written Opinion of the International Searching Authority dated Mar. 1, 2013.

\* cited by examiner

METHOD FOR PRODUCING GLASS CHOPPED STRAND MAT, AND METHOD FOR PRODUCING AUTOMOTIVE MOLDED CEILING MATERIAL

The present application is a U.S. National Stage Application based on and claiming benefit of and priority under 35 U.S.C. §371 to International Application No. PCT/JP2012/081474, filed 5 Dec. 2012, which in turn claims benefit of and priority to Japanese Application No. 2011-278987, filed 20 Dec. 2011, the entirety of each of which is hereby incorporated herein by reference.

TECHNICAL FIELD

The present invention relates to methods for producing a glass chopped strand mat by forming glass chopped strands into a sheet. The present invention also relates to methods for producing an automotive molded ceiling material using the glass chopped strand mat.

BACKGROUND ART

A glass chopped strand mat is conventionally used as a reinforcement member of a glass fiber reinforced plastic (GFRP) molded product, such as a bathtub or a septic tank. The glass chopped strand mat has in recent years been employed as a reinforcement base of an automotive molded ceiling material. The automotive molded ceiling material in which the glass chopped strand mat is attached to both sides of a foamed polyurethane sheet has been developed.

The glass chopped strand mat is produced as follows. Initially, a glass fiber is cut into pieces having a predetermined length to obtain glass chopped strands. Next, the glass chopped strands are distributed and deposited on a conveying means such as a conveyor to be formed into the shape of a sheet. The glass chopped strands are subjected to a plurality of steps while being conveyed by the conveyor. For example, the steps include spraying a binder to the glass chopped strands, heating the glass chopped strands with the adhering binder, and cooling and pressing the glass chopped strands after the heating, and the like. The glass chopped strand mat produced by these steps is wound around a core into a roll by a winding machine or the like before shipment.

The glass chopped strand mat which has been wound into a roll is processed into an automotive molded ceiling material as follows. The glass chopped strand mat is temporarily unwound. An adhesive is applied to the glass chopped strand mat. The glass chopped strand mat is wound again. Thereafter, the glass chopped strand mat with the adhesive, a foamed urethane sheet as a base member, and the like are attached together and molded into an automotive molded ceiling material having a desired shape.

In recent years, as the diversity of automotive design has increased, there has been a demand for a ceiling surface having a more complicated shape in order to further improve the design. To meet such a demand, the glass chopped strand mat used for a ceiling surface is required to have a high level of flexibility. The flexibility of the glass chopped strand mat is preferably increased by distributing glass chopped strands in the glass chopped strand mat as uniformly in all directions as possible. The flexibility may also be increased by reducing the amount of the binder added to the grass chopped strands. In these techniques, however, a sufficient tensile strength may not be imparted to the glass chopped strand mat, and in particular, when the glass chopped strand mat with the applied adhesive is temporarily unwound in the above-described process of producing the automotive molded ceiling material, the glass chopped strand mat may not withstand the tensile force and may be broken along the width direction.

Advances in automotive weight reduction have led to a demand for a reduction in the weight of the automotive molded ceiling material. This demand may be satisfied by reducing the weight of the glass chopped strand mat itself by reducing the amount of glass chopped strands which are used as a material for the glass chopped strand mat. However, when the weight of the glass chopped strand mat is reduced by reducing the amount of glass chopped strands, the tensile strength of the glass chopped strand mat obtained decreases, and therefore, the glass chopped strand mat is more likely to be broken in any process. The break of the glass chopped strand mat directly leads to a molding defect, an interruption of the producing process, or the like.

On the other hand, when the tensile strength of the glass chopped strand mat becomes excessive, the flexibility decreases, and therefore, when the automotive molded ceiling material is molded, a molding defect, such as a depression or a dimple, which is called a "sink mark," is likely to occur in the surface of the automotive molded ceiling material. As a result, the yield of the automotive molded ceiling material deteriorates, leading to a decrease in production efficiency.

Therefore, it is necessary for the glass chopped strand mat used in the automotive molded ceiling material to have both a good flexibility and a good tensile strength.

Heretofore, a known glass chopped strand mat has a difference in tensile strength between the mat width direction and the mat longitudinal direction (see Patent Document 1). Patent Document 1 describes a method for producing a glass chopped strand mat which is formed of glass chopped strands having an average strand mass density of 10 to 20 tex, has a weight of 50 to 150 g/m$^2$, an average tensile strength in the mat width direction of not more than 150 N which is measured in a tensile rupture test conducted under the Japanese Industrial Standards (Annex 13 of JIS R3420 (1999)), the standard deviation of the tensile strength being not more than 50 N, and an average tensile strength in the mat longitudinal direction of not less than 100 N. It is considered that this glass chopped strand mat has such good quality that it has a sufficient strength, and there is only a small risk of a problem with appearance, such as a pattern which stands out from the surface of a molded product in the shape of the glass chopped strand after the glass chopped strand mat is molded into an automotive molded ceiling material.

Note that Annex 13 of JIS R3420 (1999), which describes a "method for determining the tensile breaking force for textile glass mats," is a translation of ISO 3342, "Textile glass—Mats—Determination of tensile breaking force," Third Edition, 1995, where no subject matter is changed.

CITATION LIST

Patent Literature

Patent Document 1: Japanese Unexamined Patent Application Publication No. 2005-350815

SUMMARY OF INVENTION

Technical Problem

The glass chopped strand mat of Patent Document 1 has an improved tensile strength, but does not necessarily have a sufficient flexibility which allows itself to be processed into a desired shape. The flexibility and tensile strength of a glass chopped strand mat significantly depends on an arrangement (particularly, an alignment) of glass chopped strands included in the glass chopped strand mat. In general, as the alignment of glass chopped strands increases, the tensile strength of the glass chopped strand mat increases, but the flexibility decreases. In Patent Document 1, the glass chopped strand mat is formed without taking into consideration the degree of alignment of glass chopped strands, the balance between the flexibility and the tensile strength, or the like. Therefore, although a significant problem does not arise with the tensile strength of the glass chopped strand mat of Patent Document 1, the flexibility is not sufficient, and therefore, it may be difficult to mold the glass chopped strand mat into a desired shape of an automotive molded ceiling material.

As described above, at present, a method for producing a glass chopped strand mat having a good balance between flexibility and tensile strength, i.e., having both a good flexibility and a good tensile strength, has not yet been developed. With these circumstances in mind, the present invention has been made. It is an object of the present invention to provide a technique of producing a high-quality and high-functionality glass chopped strand mat which is applicable to, for example, recent automotive molded ceiling materials which have excellent design and reduced weights, with attention given to conditions under which glass chopped strands are formed into a glass chopped strand mat.

Solution to Problem

To achieve the above object, a glass chopped strand mat production method according to the present invention has the following characteristic features.

The glass chopped strand mat production method is a method for producing a glass chopped strand mat by forming glass chopped strands into a sheet, including:

a first conveying step of continuously conveying the glass chopped strands in a distributed form while spraying resin powder serving as a binder onto the glass chopped strands; and a second conveying step of continuously conveying the glass chopped strands with the adhering resin powder while performing a heating treatment on the glass chopped strands at a temperature higher than the melting point of the resin powder, in which a conveying speed in the second conveying step is higher than a conveying speed in the first conveying step, and the difference therebetween is 3 to 8 m/min.

As described in the TECHNICAL PROBLEM section, in the conventional art, it is difficult to provide a glass chopped strand mat which has a flexibility sufficient to allow itself to be easily molded into a desired shape and is also not easily broken. This is mainly because attention has been paid only to the tensile strength of a glass chopped strand mat without taking into consideration the arrangement of glass chopped strands in the glass chopped strand mat.

In this regard, the glass chopped strand mat production method having this configuration includes the first conveying step of continuously conveying the glass chopped strands in a distributed form while spraying resin powder serving as a binder onto the glass chopped strands, and the second conveying step of continuously conveying the glass chopped strands with the adhering resin powder while performing a heating treatment on the glass chopped strands at a temperature higher than the melting point of the resin powder. The conveying speed in the second conveying step is set to be higher than the conveying speed in the first conveying step, and the difference therebetween is set to 3 to 8 m/min. As a result, when the glass chopped strands are transferred from the first conveying step to the second conveying step, the glass chopped strands are pulled in the conveying direction to be aligned to an appropriate extent. Therefore, the tensile strength in the conveying direction increases, and the thickness of the glass chopped strand mat thus obtained decreases, resulting in a reduction in weight. In addition, according to the results of the extensive study by the present inventors, it has been found that if the difference between the conveying speed in the second conveying step and the conveying speed in the first conveying step is set to 3 to 8 m/min, the glass chopped strand mat is not likely to be broken in any of various steps while a sufficient flexibility is maintained which allows the glass chopped strand mat to be easily molded into a desired shape. Therefore, if a glass chopped strand mat is produced under the above production conditions, the glass chopped strand mat can have a good balance between flexibility and tensile strength, i.e., have both a good flexibility and a good tensile strength, and a lighter weight.

In the glass chopped strand mat production method of the present invention, the second conveying speed is preferably 75 to 78 m/min.

In the glass chopped strand mat production method of this configuration, the second conveying speed is set to 75 to 78 m/min. This conveying speed is considerably high compared to conventional production conditions. In general, when glass chopped strands are conveyed at such a high speed, an excessive tension occurs in the conveying direction, and therefore, the glass chopped strands are easily separated from each other. However, as described above, the difference in conveying speed between the second conveying step and the first conveying step is set to 3 to 8 m/min, and therefore, the glass chopped strands are not separated from each other while being conveyed, and therefore, the glass chopped strand mat is not broken. Therefore, the time it takes to produce the glass chopped strand mat can be significantly reduced. As a result, a glass chopped strand mat which has a good balance between flexibility and tensile strength, i.e., has both a good flexibility and a good tensile strength, and a lighter weight, can be efficiently produced.

In the glass chopped strand mat production method of the present invention, the glass chopped strands preferably have a weight of 50 to 150 $g/m^2$, where the weight is the mass per unit area.

In the glass chopped strand mat production method of this configuration, the glass chopped strands have a weight of as low as 50 to 150 $g/m^2$, where the weight is the mass per unit area. Therefore, a glass chopped strand mat which has a good balance between flexibility and tensile strength, i.e., has both a good flexibility and a good tensile strength, and a lighter weight, can be produced.

To achieve the above object, an automotive molded ceiling material production method according to the present invention has the following characteristic feature.

The method includes:

a layering step of putting a glass chopped strand mat produced by the glass chopped strand mat production method of the present invention on one or both sides of a flexible base sheet.

In the automotive molded ceiling material production method of this configuration, the glass chopped strand mat produced by the glass chopped strand mat production method of the present invention can be used to satisfactorily perform a molding process to provide an automotive molded ceiling material even having a complicated shape, for example. In other words, if the glass chopped strand mat which has a good balance between flexibility and tensile strength (i.e., has both a good flexibility and a good tensile strength) and a lighter weight is provided on one or both sides of a flexible base sheet, an automotive molded ceiling material which is reinforced and has a lighter weight and a good design flexibility can be provided.

DESCRIPTION OF EMBODIMENTS

Figure 1:
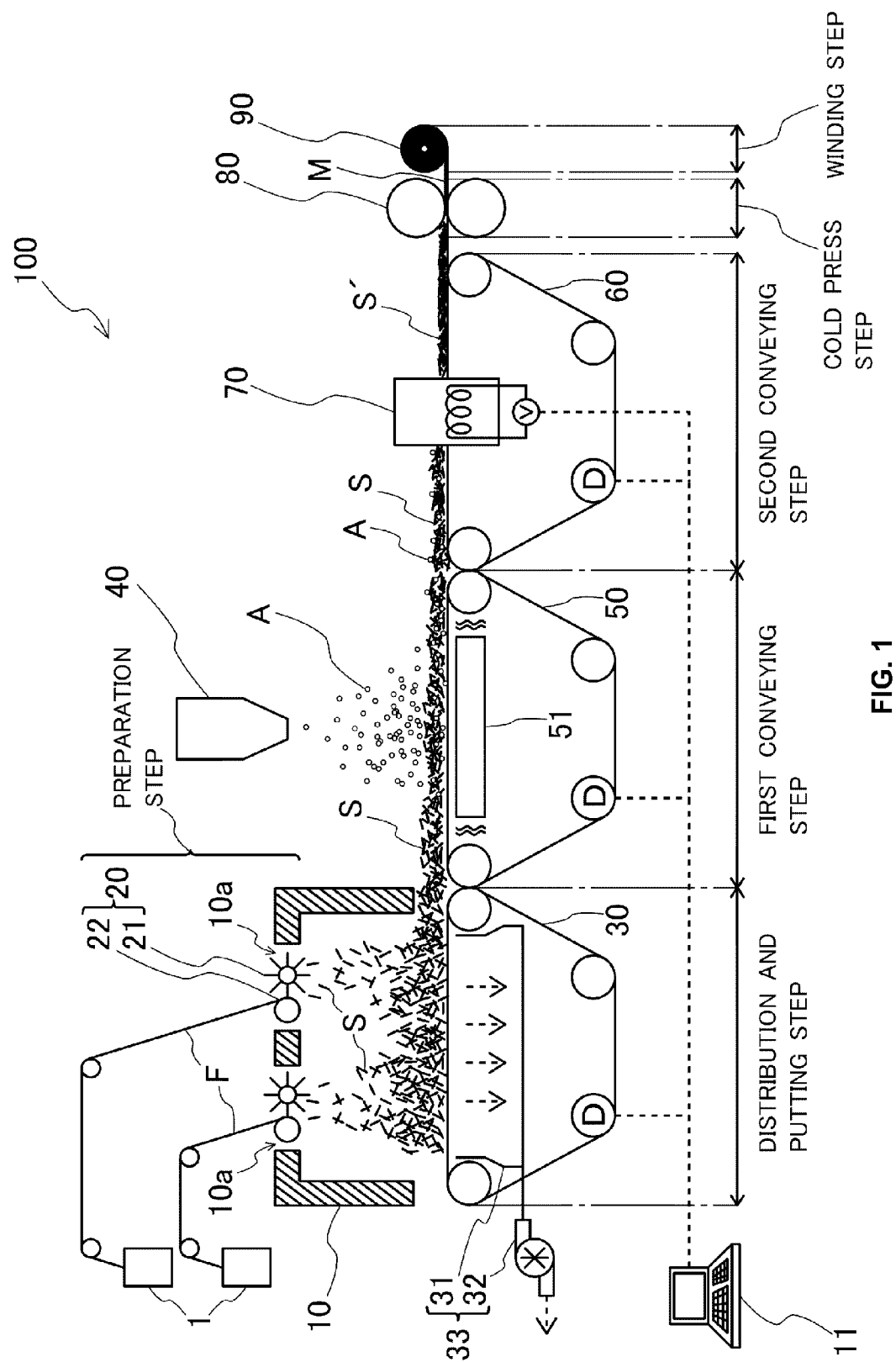
FIG. 1 is a schematic diagram showing an overall configuration of a glass chopped strand mat production apparatus for performing a glass chopped strand mat production method according to the present invention.

A method for producing a glass chopped strand mat according to the present invention and a method for producing an automotive molded ceiling material according to the present invention will be described hereinafter with reference to FIGS. 1 and 2. Note that, in the present specification, an apparatus for producing the glass chopped strand mat is also described for the sake of convenience. Note that the present invention is not intended to be limited to embodiments described below or configurations shown in the drawings.

<Apparatus for Producing Glass Chopped Strand Mat>

FIG. 1 is a schematic diagram showing an overall configuration of a glass chopped strand mat production apparatus 100 for performing a method for producing a glass chopped strand mat according to the present invention (hereinafter simply referred to as a "production apparatus").

The production apparatus 100 produces a glass chopped strand mat from glass chopped strands. The production apparatus 100 mainly includes a chamber 10, a cutting device 20, a distribution conveyor 30, a binder sprayer 40, a first conveyor 50, a second conveyor 60, a heating furnace 70, a cold press roller 80, a winding machine 90, etc.

The distribution conveyor 30, the first conveyer 50, and the second conveyor 60 are successively positioned in this stated order from upstream to downstream. These conveyors are driven by respective motors D. The conveying speeds (the movement speeds of the belts) of the conveyors are controlled by a computer (control means) 11. Note that a worker may manually adjust the conveying speed of each conveyor as appropriate.

The distribution conveyor 30 includes a belt on which glass chopped strands are distributed and put. The distribution conveyor 30 is provided below the chamber 10 which accommodates glass chopped strands. The cutting device 20 which cuts a glass fiber F described below is attached to a glass fiber inlet 10a provided in a top portion of the chamber 10. The cutting device 20 includes a cutter roller 21 and a rubber roller 22. The glass fiber F is fed between the rotating cutter roller 21 and rubber roller 22 to be continually cut, whereby glass chopped strands S are produced. The glass chopped strands S fall by their own weight in the chamber 10 and are substantially uniformly distributed and put on the belt of the distribution conveyor 30.

The binder sprayer 40 is provided above the first conveyor 50. The binder sprayer 40 sprays a binder A described below toward the glass chopped strands S on the belt of the first conveyor 50. Note that a water sprayer (not shown) may be effectively provided above or below the first conveyor 50, upstream of the binder sprayer 40, in order to allow the binder A to more easily adhere to the glass chopped strands S.

The heating furnace 70 is provided halfway through the second conveyor 60, surrounding the belt. The heating furnace performs a heating treatment on an object on the second conveyor 60 which is being moved through the heating furnace 70. Therefore, the belt of the second conveyor 60 is formed of a heat resistant material, such as a metal. The cold press roller 80 is provided downstream of the second conveyor 60. The cold press roller 80 presses the heated object while cooling the object.

(Method for Producing Glass Chopped Strand Mat)

The glass chopped strand mat of this embodiment is produced by a step of preparing the glass chopped strands S, a distribution and putting step, a first conveying step, a second conveying step, a cold press step, and a winding step. Of these steps, the first and second conveying steps have a characteristic feature of the present invention and are essential to the present invention. The above steps will now be described.

<Glass Chopped Strand Preparation Step>

As a preliminary step of the production of a glass chopped strand mat, the glass chopped strands S are prepared. A glass material is heated to obtain hot melted glass in a glass melting furnace (not shown) provided on the production line. The glass material contains components from which a glass fiber of E-glass can be produced. The melted glass is clarified and homogenized, and thereafter, is caused to flow via a feeder (not shown) into a bushing (not shown). The base plate of the bushing has a plurality of bushing nozzles. The melted glass is discharged from the bushing nozzles and spun into a fibrous glass monofilament. After the glass monofilament is cooled, a bundling agent is applied thereto. A plurality of the glass monofilaments are bundled together into a glass fiber F, which is then wound into a glass cake 1. The glass fiber F extracted from the glass cake 1 is fed into the cutting device 20 provided in the top portion of the chamber 10 and is then cut into pieces having a length of about 50 mm. Thus, in this embodiment, the preparation step of cutting the glass fiber F into the glass chopped strands S is performed. Note that the glass chopped strands S do not necessarily need to be prepared immediately before the production of the glass chopped strand mat, and alternatively, may be previously prepared. In this case, for example, the glass chopped strands S which are accommodated in a container (e.g., a flexible container) are fed directly into the chamber 10.

<Distribution and Putting Step>

The glass chopped strands S obtained by the glass chopped strand preparation step fall onto the belt of the distribution conveyor 30 in the chamber 10. A suction device including a suction duct 31 and a blower 32 is provided below the belt on which the glass chopped strands S are deposited, and a negative pressure is applied to the belt. As a result, the glass chopped strands S are attracted to a surface of the belt while being substantially uniformly distributed and put on the belt of the distribution conveyor 30, and therefore, are settled without being scattered around. The conveying speed in the distribution and putting step is preferably 69 m/min to 74 m/min. If the conveying speed is within this range, the glass chopped strands S can be deposited into an appropriate thickness, and the production time of the glass chopped strand mat can be significantly reduced. The glass chopped strands S which have been deposited on the belt of the distribution conveyor 30 to be formed into the shape of a sheet are conveyed to a downstream point for the next step.

<First Conveying Step>

The glass chopped strands S which have been deposited to be formed into the shape of a sheet are moved to the first conveyor 50. The binder sprayer 40 is provided above the first conveyor 50. The binder sprayer 40 sprays the binder (resin powder) A to the surfaces of the glass chopped strands S. The addition of the binder A to the glass chopped strands S allows the glass chopped strands S to stick together by a heating treatment described below, so that the mat shape can be maintained. The binder A is preferably a powder of thermoplastic resin (e.g., powdered polyester resin (e.g., NEW TRACK 514 produced by Kao Corporation)). Other examples of the available thermoplastic resin powder include resin powders of nylon, polyethylene, polystyrene, polypropylene, polyvinyl chloride, etc.

A water sprayer (not shown) may be effectively provided upstream of the binder sprayer 40. The water sprayer sprays water toward the glass chopped strands S on the belt of the first conveyor 50. If the glass chopped strands S are previously wetted with water, the binder A more easily adheres to the surfaces of the glass chopped strands S due to the action of the surface tension of the water, and therefore, the glass chopped strands S stick together more effectively. Therefore, even if the weight (mass per unit area of glass chopped strands S) is set to the range of 50 to 150 g/m$^2$, which is lower than a typical weight, the glass chopped strand mat, which is the final product, can have a good balance between flexibility and tensile strength, i.e., have both a good flexibility and a good tensile strength. The glass chopped strand mat can also have a thinner thickness and a lighter weight. Note that the weight of the glass chopped strand mat is preferably 70 to 140 g/m$^2$, more preferably 80 to 120 g/m$^2$.

A vibrator 51 is provided below the belt of the first conveyor 50 on which the glass chopped strands S are deposited, to vibrate the belt of the first conveyor 50. This causes the binder A scattered to the surfaces of the glass chopped strands S to enter gaps between the glass chopped strands S which have been deposited to be formed into the shape of a sheet. As a result, the binder A adheres uniformly to all the glass chopped strands S.

The glass chopped strands S on the first conveyor 50 are conveyed to the downstream second conveyor 60 with the binder A uniformly adhering to the glass chopped strands S.

<Second Conveying Step>

The heating furnace 70 surrounds the belt of the second conveyor 60. The temperature of atmosphere in the heating furnace 70 is controlled by a computer 11 to be appropriately adjusted to a temperature higher than or equal to the melting point of the synthetic resin included in the sprayed binder A, depending on the type of the binder A. Note that the temperature of the heating furnace 70 may be manually adjusted by a worker. The glass chopped strands S with the adhering binder A on the belt of the second conveyor 60 are subjected to the heating treatment while passing through the heating furnace 70, whereby the binder A is softened and melted. As a result, the glass chopped strands S stick together (the glass chopped strands S after being heated are referred to as "glass chopped strands 5'" to discriminate from those before being heated). Because the belt of the second conveyor 60 is thus exposed to high temperature, the belt is formed of a heat resistant material, such as a metal.

In this embodiment, the conveying speed in the second conveying step is set to be higher than the conveying speed in the first conveying step. As a result, when the glass chopped strands S are transferred from the first conveying step (the first conveyor 50) to the second conveying step (the second conveyor 60), the glass chopped strands S are pulled in the conveying direction to be aligned to an appropriate extent. Specifically, the glass chopped strands S are generally uniformly distributed and put on the distribution conveyor 30, and are then conveyed to the first conveyor 50 while being kept in such a state, and therefore, are generally oriented in random directions in the first conveying step. Next, immediately after the glass chopped strands S are transferred to the second conveying step, the conveying speed of the glass chopped strands S increases. At this time, a tension occurs in the glass chopped strands S due to the difference in conveying speed. As a result, each glass chopped strand S is stretched in the conveying direction, and therefore, the glass chopped strands S have equal fiber lengths in the conveying direction. As a result, the tensile strength in the conveying direction increases, and therefore, the thickness of the deposition of the glass chopped strands S decreases, resulting in a decrease in weight per unit area. This leads to a reduction in weight of the glass chopped strand mat, which is the subsequent final product.

According to the result of the extensive study conducted by the present inventors, it has been found that if the difference in conveying speed between the second conveying step and the first conveying step is set to 3 to 8 m/min, the glass chopped strand mat is not likely to be broken in any of various steps while a sufficient flexibility is maintained which allows the glass chopped strand mat to be easily molded into a desired shape. If the conveying speed difference is less than 3 m/min, the glass chopped strands S are less aligned, and therefore, the tensile strength in the longitudinal direction is not sufficient and wrinkles are likely to occur in the surface of the glass chopped strand mat, which is the final product. On the other hand, if the conveying speed difference is more than 8 m/min, the weight of the glass chopped strand mat, which is the final product, decreases, and therefore, the thickness decreases, so that a very thin portion or a void is likely to occur in the mat surface, resulting in a significant decrease in tensile strength.

In this embodiment, the second conveying speed is set to to 78 m/min. This conveying speed is considerably high compared to conventional production conditions. In general, when the glass chopped strands S are conveyed at such a high speed, an excessive tension occurs in the conveying direction, and therefore, the glass chopped strands S are easily separated from each other. However, in this embodiment, as described above, the difference in conveying speed between the second conveying step and the first conveying step is set to 3 to 8 m/min, and therefore, the glass chopped strands S are not separated from each other while being conveyed, and therefore, the glass chopped strand mat is not broken. Therefore, the time it takes to produce the glass chopped strand mat, which is the final product, can be significantly reduced.

<Cold Press Step>

The cold press step of processing the glass chopped strands S' which have been heated, into a mat, is performed by the cold press roller 80 which is provided downstream of the second conveyor 60. The cold press roller 80 includes a pair of rollers. The glass chopped strands S' with the melted binder A is conveyed to the cold press roller 80 and passed through the nip. The glass chopped strands S' are cooled and pressed by being passed through the cold press roller 80, whereby the glass chopped strands S' are bound together. As a result, the glass chopped strand mat M is produced. The cold press roller 80 air-cools the glass chopped strands S'. Alternatively, the glass chopped strands S' may be actively cooled with cooling water flowing inside the cold press roller 80.

<Winding Step>

The winding step is performed by the winding machine 90 which is provided downstream of the cold press roller 80. The glass chopped strand mat M which has been pressed is wound around the core of the winding machine 90 to form a roll product.

(Method for Producing Automotive Molded Ceiling Material)

Figure 2:
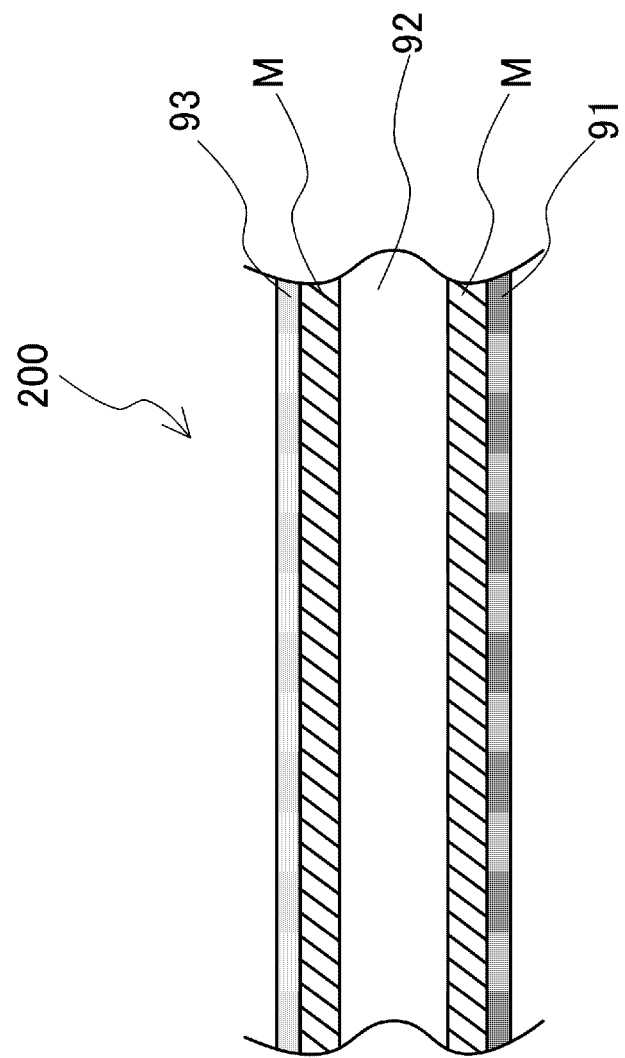
FIG. 2 is a cross-sectional view of a portion of an automotive molded ceiling material according to the present invention.

FIG. 2 is a cross-sectional view of a portion of an automotive molded ceiling material 200 including the glass chopped strand mat M of the present invention.

The automotive molded ceiling material 200 is produced as follows. The above-described glass chopped strand mat M which has been wound into a roll is temporarily unwound. An adhesive is applied to the surface thereof. The adhesive may be, for example, an isocyanate adhesive. The glass chopped strand mat M with the applied adhesive is wound again. The automotive molded ceiling material 200 typically includes a front skin 91, the glass chopped strand mat M, a foamed urethane sheet 92 which is a base member, and a back skin 93. Each of these members is previously wound into a roll, and is unwound before the molding process. In the molding process, the front skin 91 (closer to the passenger compartment of an automobile), a first glass chopped strand mat M, the foamed urethane sheet 92, a second glass chopped strand mat M, and the back skin 93 (closer to the body of an automobile) are stacked on top of each other successively in this stated order from bottom. Note that the glass chopped strand mat M may be put on only one side of the foamed urethane sheet 92. Thereafter, the multilayer sheet is put into a compression mold which has a carbide blade at open edges thereof. The compression mold has the desired shape of the automotive molded ceiling material 200. After compression molding, end portions are trimmed to complete the production of the automotive molded ceiling material 200.

The glass chopped strand mat M produced by the glass chopped strand mat production method of the present invention can be used to satisfactorily perform a molding process to provide an automotive molded ceiling material even having a complicated shape, for example. In other words, if the glass chopped strand mat M which has a good balance between flexibility and tensile strength (i.e., has both a good flexibility and a good tensile strength) and a light weight is provided on one or both sides of the foamed urethane sheet 92, a molding defect such as a sink mark does not occur when compression molding is performed on the multilayer sheet to form the automotive molded ceiling material 200. The automotive molded ceiling material 200 thus produced has a high strength, and a lighter weight and a good design flexibility.

EXAMPLES

Examples relating to the glass chopped strand mat produced by the glass chopped strand mat production method of the present invention will be described.

In the examples, glass chopped strand mats were produced and tested under four sets of test conditions that the first conveyor in the first conveying step had different conveying speeds and the second conveyor in the second conveying step had the same conveying speed (Examples 1 to 4). The tensile strength of the glass chopped strand mat obtained in each example was measured. Note that the weight (mass per unit area) of glass chopped strands was 107 g/m$^2$ in Examples 1, 2, and 4, and 90 g/m$^2$ in Example 3.

The glass chopped strand mats of Examples 1 to 4 were produced by the same process as that described in the above embodiment using a production apparatus of the same type as that of the production apparatus 100 of FIG. 1. In Examples 1, 2, and 4 in which the weight was the same, the amount per unit time of the glass fiber F cut by the cutting device 20 (the amount of the glass chopped strands S produced) was the same, and the amount per unit time of the binder A sprayed by the binder sprayer 40 was the same.

The production conditions and test results of Examples 1 to 4 are shown in the following Table 1.

TABLE 1

|  | Example 1 | Example 2 | Example 3 | Example 4 |
| --- | --- | --- | --- | --- |
| Weight (g/m$^2$) | 107 | 107 | 90 | 107 |
| Conveying speed in first conveying step (m/min) | 69.0 | 71.3 | 71.3 | 73.5 |
| Conveying speed in second conveying step (m/min) | 76.6 | 76.6 | 76.6 | 76.6 |
| Speed difference (m/min) | 7.6 | 5.3 | 5.3 | 3.1 |
| Tensile strength in width direction (N) | 153 | 136 | 109 | 154 |
| Tensile strength in longitudinal direction (N) | 206 | 175 | 149 | 171 |
| Tensile strength ratio (width direction/longitudinal direction) | 0.74 | 0.78 | 0.73 | 0.90 |

In all of the examples, the weights were within the range of 50 to 150 g/m$^2$. The conveying speed of the first conveyor in the first conveying step was set to 69.0 m/min in Example 1, 71.3 m/min in Example 2, 71.3 m/min in Example 3, and 73.5 m/min in Example 4. The conveying speed of the second conveyor in the second conveying step was set to the same value, 76.6 m/min, in Examples 1 to 4. In all of the examples, the conveying speed in the second conveying step was higher than the conveying speed in the first conveying step, and the difference between these speeds (hereinafter referred to as a "speed difference") was 7.6 m/min in Example 1, 5.3 m/min in Example 2, 5.3 m/min in Example 3, and 3.1 m/min in Example 4, i.e., was within the range of 3 to 8 m/min in all of the examples. The tensile strength was measured by performing a tensile rupture test where the width of a test specimen was 150 mm, according to the Japanese Industrial Standards (Section 7.25 of JIS R3420 (2006)). The average value of test results where n=40 was calculated. Section 7.25 of JIS R3420 (2006) specifies as follows.

<7.25 of JIS R3420 (2006)>

7.25 Tensile strength of mats. A method for testing the tensile strength of mats is specified. The method is intended for chopped strand mats but is equally applicable to continuous filament mats.

7.25.1 Principle. A pre-conditioned test specimen of standard dimensions is subjected to tension by a suitable device which indicates the tensile breaking force on a recorder or the like. The maximum force required to break the test specimen in a tensile test carried to rupture is generally expressed in newtons (N).

7.25.2 Testing apparatus. The following testing machines shall be used.

a) Tensile-testing machine. All testing machines shall include the following elements.
1) A pair of suitable clamps to grip the specimen. They shall have a width of 160 mm and a minimum depth of 25 mm. The faces of the clamps shall be plane and parallel, shall ensure uniform pressure over the whole width of the test specimen, and shall prevent it from slipping. The clamps shall also ensure, at all times, alignment with the direction of the force applied to the test specimen. The initial distance between the clamps shall be 200 mm.
2) A means for applying tension to the test specimen.
3) A mechanism that will continuously indicate or record the force sustained by the test specimen. The mechanism shall be practically free from inertia at the specified speed of testing and shall indicate the force with an accuracy within 1% of the true value. There are two types of testing machines recommended, i.e., one having a constant rate of extension and one having a constant rate of loading. If only such testing machines are available, they may be used by agreement between interested parties, but the results from different types of testing machines cannot necessarily be compared.

4) The maximum error in the indicated force, at any point in the range in which the testing machine is used, shall not exceed 1% of the true force. The acceptable error in the clamp separation indication value shall not exceed 2 mm. The accuracy of the tensile-testing machine shall be verified, for example, by means of calibrated springs with appropriate characteristics.

b) Equipment for producing a suitable preconditioning atmosphere.

c) Equipment for producing and maintaining the standard laboratory test atmosphere.

d) Hard Template.
1) For chopped strand mat: 150 mm (width)×316 mm (length) or 300 mm (width)×300 mm (length)
2) For continuous strand mat: 75 mm (width)×316 mm (length)

e) Specimen trimming tool. An appropriate tool, such as a knife, scissors, or a disc cutter.

f) Stopwatch.

7.25.3 Conditioning and test atmosphere.

a) Conditioning. Carry out in the standard atmosphere specified in Section 4 (Section 4 specifies air temperature t: 23° C., relative humidity U: 50%).
1) Condition rolls for 16 h as a standard. Note that the time may be determined by agreement between interested parties.
2) Condition test specimens for 1 h.

b) Test atmosphere. Carry out in the standard atmosphere specified in Section 4.

7.25.4 Test specimen. Before preparing any test specimens, remove and discard defects from both sides of a mat to obtain an area free from any damage. From this area, cut a strip at least 400 mm wide. Handle this strip with great care in order to avoid creasing it. Take the same precautions with strips cut out as described below. Using the template, cut from this strip the required number of test specimens of 150 mm (or 75 mm) (width)×316 mm (length), with the major axis of the specimens parallel to the longitudinal direction of the mat. Cut out these specimens (one specimen per 316 mm wide of the mat) ensuring that they are evenly distributed and equidistant from each other and are not less than 10 mm from the edges in the case of trimmed mats.

At least five specimens are used.

If the required number of test specimens cannot be taken from one strip, test specimens are taken from a plurality of strips, ensuring that the test specimens are evenly distributed over the whole mat.

It is convenient to cut the specimens from a mat having a definite mass per unit area.

Note that when there is a request that test specimens are taken using other methods in production specifications or an individual order, this shall be recorded in the test report.

7.25.5 Procedure a) Adjust the distance between the clamps so that the free length of a test specimen is 200 mm.

b) Adjust the speed of the testing machine so that the clamp separation speed is 200±10 mm/min or 100±10 mm/min.

c) Verify that the clamps are correctly aligned on a straight line and are parallel to each other. Mount the test specimen to the clamps so that the longitudinal axis of the test specimen coincides with the tensile axis of the tensile tester. Firmly close the clamps evenly, and apply a small tension to the test specimen so that the test specimen extends sufficiently straight. Actuate the tensile tester to elongate the test specimen to the point of rupture. Record the force required to break the test specimen in newtons (N). Test the required number of test specimens. If the test specimen breaks within 10 mm from the edge of the clamp or slips in the clamp, the result of it is excluded (see 7.25.4). A crack in the test specimen is not a clear break (or rupture), and this shall be recorded in the test report.

7.25.6 Expression of results. Express the value obtained from each test specimen in newtons (N). Round the value to 1 N as the tensile breaking force of the mat. Indicate the confidence levels of the standard deviation and the average.

The following findings were obtained from the examples.

(1) The ratio of the tensile strength in the width direction to the tensile strength in the longitudinal direction (the width direction/the longitudinal direction) of the example glass chopped strand mat was 0.74 in Example 1, 0.78 in Example 2, 0.73 in Example 3, and 0.90 in Example 4. In all of the examples, the tensile strength ratios were within the range of 0.73 to 1.00.

(2) The glass chopped strand mats of the examples had such a sufficient tensile strength that a break or a molding defect does not occur during the molding process.

(3) When the weights were the same, the tensile strength in the longitudinal direction increased with an increase in the speed difference.

(4) When the weights were the same, the ratio of the tensile strength in the width direction to the tensile strength in the longitudinal direction (the width direction/the longitudinal direction) decreased with an increase in the speed difference.

(5) When the weights were the same, a definite influence due to the speed difference on the tensile strength in the width direction was not verified.

(6) When the weights were different, the tensile strengths in the width and longitudinal directions and the tensile strength ratio (the width direction/the longitudinal direction) increased with an increase in the weight irrespective of the magnitude of the speed difference.

As a comparative example, a glass chopped strand mat was produced under conditions that the speed difference was 12.0 m/min, which exceeds the upper limit value of the present invention. As a result, the weight was much lower than the set value, and a number of voids occurred. Therefore, the yield of the product decreased, leading to an increase in producing cost. Alternatively, a glass chopped strand mat was produced under conditions that the speed difference was 0.0 m/min, which is lower than the lower limit value of the present invention (i.e., the conveying speed of the first conveyor in the first conveying step and the conveying speed of the second conveyor in the second conveying step are set to be equal to each other). As a result, a number of noticeable wrinkles occurred in the mat surface, and the tensile strength was not sufficient. Therefore, the product had a bad balance between tensile strength and flexibility.

Next, the glass chopped strand mats of Examples 1 to 4 were put on both sides of a foamed urethane sheet to produce automotive molded ceiling materials. When the glass chopped strand mats of the examples were temporarily unwound in the producing process of the automotive molded ceiling material, these glass chopped strand mats were smoothly unwound without being broken in the width direction due to tension. Also, in the molding process of the automotive molded ceiling material, a molding defect such as a sink mark did not occur in the surface of the automotive molded ceiling material.

As described above, it has been found that the glass chopped strand mat produced by the glass chopped strand mat production method of the present invention has a good balance between flexibility and tensile strength, i.e., has both a good flexibility and a good tensile strength. It has also been found that by using the glass chopped strand mat produced by the glass chopped strand mat production method of the present invention, recent automotive molded ceiling materials which have excellent design and reduced weights can be produced. When an automotive molded ceiling material is produced using the glass chopped strand mat of the present invention, the yield and production efficiency are good, leading to a reduction in producing cost.

INDUSTRIAL APPLICABILITY

The glass chopped strand mat obtained by the glass chopped strand mat production method of the present invention is applicable to automotive molded ceiling materials, and in addition, interior materials for other vehicles and interior materials for buildings.

REFERENCE SIGNS LIST

10 CHAMBER
20 CUTTING DEVICE
30 DISTRIBUTION CONVEYOR
40 BINDER SPRAYER
50 FIRST CONVEYOR
60 SECOND CONVEYOR
70 HEATING FURNACE
80 COLD PRESS ROLLER
90 WINDING MACHINE
91 FRONT SKIN
92 FOAMED URETHANE SHEET
93 BACK SKIN
100 GLASS CHOPPED STRAND MAT PRODUCTION APPARATUS
200 AUTOMOTIVE MOLDED CEILING MATERIAL
F GLASS FIBER
S, S' GLASS CHOPPED STRAND
A BINDER (RESIN POWDER)
M GLASS CHOPPED STRAND MAT

The invention claimed is:

1. A method for producing a glass chopped strand mat by forming glass chopped strands into a sheet, comprising:
  a first conveying step of continuously conveying the glass chopped strands in a distributed form while spraying resin powder serving as a binder onto the glass chopped strands; and
  a second conveying step of continuously conveying the glass chopped strands with the adhering resin powder while performing a heating treatment on the glass chopped strands at a temperature higher than the melting point of the resin powder, wherein
  a conveying speed in the second conveying step is higher than a conveying speed in the first conveying step, and the difference therebetween is 3 to 8 m/min.

2. The method of claim 1, wherein
the second conveying speed is 75 to 78 m/min.

3. The method of claim 1, wherein
the glass chopped strands have a weight of 50 to 150 g/m$^2$, where the weight is the mass per unit area.

4. The method of claim 2, wherein
the glass chopped strands have a weight of 50 to 150 g/m$^2$, where the weight is the mass per unit area.

* * * * *